United States Patent
Weatherhead

(10) Patent No.: US 6,642,169 B2
(45) Date of Patent: Nov. 4, 2003

(54) POLYMERISATION CATALYSTS

(75) Inventor: Richard Henry Weatherhead, Surrey (GB)

(73) Assignee: BP Chemicals Limited, London (GB)

( * ) Notice: Subject to any disclaimer, the term of this patent is extended or adjusted under 35 U.S.C. 154(b) by 111 days.

(21) Appl. No.: 09/775,802

(22) Filed: Feb. 5, 2001

(65) Prior Publication Data

US 2001/0044377 A1 Nov. 22, 2001

Related U.S. Application Data

(63) Continuation of application No. PCT/GB99/02465, filed on Jul. 28, 1999.

(30) Foreign Application Priority Data

Aug. 5, 1998 (GB) .............................................. 9816940

(51) Int. Cl.$^7$ ............................ B01J 31/00; B01J 37/00; C08F 4/02; C08F 4/60; C08F 4/44
(52) U.S. Cl. ....................... 502/118; 502/128; 526/132; 526/133; 526/134
(58) Field of Search ................................ 502/118, 128; 526/132, 133, 134

(56) References Cited

U.S. PATENT DOCUMENTS 6,136,744 A * 10/2000 Gillis et al. ................. 502/118
6,399,532 B1 * 6/2002 Dorer et al. ................. 502/118

FOREIGN PATENT DOCUMENTS

| EP | 0 427 697 A2 A3 | 5/1991 |
| EP | 0 540 108 A1 | 5/1993 |
| EP | 0 629 631 A2 A3 | 12/1994 |
| EP | 0 719 797 A2 A3 | 7/1996 |
| WO | 91/05810 | 5/1991 |

OTHER PUBLICATIONS

US 2001/0008927 A1, US Pre–Grant publication to Sato et al., published Jul. 2001.*

* cited by examiner

Primary Examiner—Mark L. Bell
Assistant Examiner—J. Pasterczyk
(74) Attorney, Agent, or Firm—Nixon & Vanderhye

(57) ABSTRACT

A catalyst system suitable for preparing substantially terminally unsaturated atactic polymers or copolymers of α-olefins having a number average molecular weight in the range 300–500,000 comprises (A) a metallocene complex and (B) a cocatalyst comprising (i) a Group III Metal alkyl compound and (ii) a triaryl boron compound. Preferred metallocenes are those having alkyl ligands on the metal atom. The preferred Group III metal alkyl compound is triisobutyl aluminum and the preferred triaryl boron compounds is tris(pentafluorophenyl)boron.

14 Claims, No Drawings

POLYMERISATION CATALYSTS

This application is a continuation of PCT/GB99/02465 filed Jul. 28, 1999.

The present invention relates to a catalyst system for use in the preparation of substantially terminally unsaturated polyolefins.

Substantially terminally unsaturated polyolefins where the terminal group in the polymer is a vinylidene group have been used as starting materials for the preparation of a variety of compounds for example oil additives, sealants, dispersants, cleaning agents, etc. Such terminally unsaturated polyolefins, especially poly(iso)butenes, have been prepared using various catalysts such as boron trifluoride as claimed and described in our EP-A-0145235 and EP-A-0671419. Other processes have been used to produce conventional polymers of 1-olefins using catalysts such as metallocenes alone or in combination with an activator/cocatalyst such as methylaluminoxane. Polyolefins which can be produced by the latter method include homopolymers of propylene, 1-butene, 1-pentene, 1-hexene and 1-octene as well as copolymers of such olefins with one another, in particular copolymers of propylene e.g. with ethylene. Such polyolefins are characterised by a low molecular weight typically in the range 300–5000.

A particular advantage of such terminally unsaturated polymers is their high degree of reactivity especially towards enophiles such as unsaturated dicarboxylic acid anhydrides which make them particularly suitable for the ene/enophile reactions which enable functionalisation of such polymers into useful products such as lubricating oil additives.

For example EP-A-353935 describes ethylene/alpha-olefin copolymer substituted mono- and dicarboxylic acid lubricant dispersant additives in which the ethylene copolymer is prepared by use of bis(n-butylcyclopentadienyl) zirconium dichloride catalyst and methylaluminoxane (MAO) cocatalyst.

EP-A-490454 describes alkenyl succinimides as lube oil additives comprising an alkenyl substituent group derived from a propylene oligomer which is conveniently prepared using as a catalyst a bis(cyclopentadienyl)zirconium compound and cocatalyst MAO.

Similarly, EP-A-268214 describes the use of an alkyl substituted cyclopentadienyl compound of zirconium or hafnium for the oligomerisation of propylene. A vast number of compounds are listed which include inter alia [(CH3)$_5$C$_5$]$_2$ ZrCl$_2$. However, all the compounds listed are bis (penta-alkyl substituted cyclopentadiene) derivatives of zirconium or hafnium and these tend to give rise to polymers in which the terminal unsaturated linkage is predominantly a vinyl linkage.

EP 427697 describes a catalyst system based on a neutral metallocene, an aluminium alkyl and a Lewis acid e.g. tris(pentafluorophenyl)boron. In such a system the Lewis acid is utilised to ionize the neutral metallocene to form an ionic metallocene catalyst system. EP 570982 describes the use of a catalyst system comprising a metallocene, an organoaluminium compound and an ionic compound e.g. a trialkylammnonium borate. The catalyst system described may also comprise a boron compound e.g. tris (pentafluorophenyl) borane. Again in this system an ionic metallocene is prepared by interaction between the complex and the ionic compound.

We have now found that certain metallocene complexes when used in the presence of Group III metal alkyl compounds and Lewis acids comprising aryl boron compounds may be suitable for the preparation of substantially terminally unsaturated polyolefins having molecular weights in the range 300–500,000.

Thus according to the present invention there is provided a catalyst system suitable for use for the preparation of substantially terminally unsaturated atactic polymers or copolymers of α-olefins having a number average molecular weight in the range 300–500,000 said catalyst system comprising (A) a metallocene of formula:

wherein

CpH is a cyclopentadienyl ligand,

Each R represents an alkyl or an aryl substituent on the CpH ligand or two R groups may be joined together to form a ring, or the R groups in each CpH group when taken together represents an Si or C bridging group linking two CpH groups wherein said Si or C group may itself be substituted by hydrogen atoms or C1–C3 alkyl groups, M is a metal selected from hafnium, zirconium and titanium, Z and Y are anionic ligands and may be the same or different, and (B) a cocatalyst comprising (i) a Group III metal alkyl compound and (ii) a triarylboron compound.

Unless otherwise specified, the terms (co) polymers and (co) polymerisation are used herein and throughout the specification to cover the homopolymerisation and copolymerisation of α-olefins as well as including oligomerisation.

By substantially terminally unsaturated polymers or copolymers is meant polymers or copolymers having ≧60% polymer chains which contain terminal unsaturation.

More specifically, catalysts that may be used to (co) polymerise α-olefins include bis(alkyl cyclopentadienyl) metallocenes wherein R is a suitably a methyl group. Thus, the alkyl substituent on the cyclopentadienyl ligands in the metallocene may be a methyl-; 1,3-dimethyl-; 1,2,4-trimethyl-; or tetramethyl-group. Where R represents a substituted or unsubstituted silicon or carbon bridging group linking two CpH ligands, such metallocenes are suitably dimethylsilyl dicyclopentadienyl-zirconium, -hafnium or -titanium compound.

When two R groups are joined together the cyclopentadienyl ligand may be represented by indenyl or hydrogenated indenyl.

The metal M in the metallocene may be zirconium, hafnium or titanium. Of these zirconium is preferred.

The group Z or Y in the metallocene is preferably hydrocarbyl and most preferably alkyl. The most preferred metallocene complexes are those wherein Z and Y is methyl.

The preferred metallocenes for use in the present invention are bis(1,3-dimethylcyclopentadienyl)zirconium dimethyl and bis(cyclopentadienyl)zirconium dimethyl.

The Z and Y ligands may also be selected from a 1,3-diketone group, a β-ketoester and a triflate. The diketonate comprises an anion of the formula

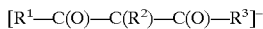

where $R^1$, $R^2$ and $R^3$ may be the same or different alkyl or aryl groups or halogenated alkyl groups and in addition $R^2$ may be a hydrogen atom. The keto-ester anion comprises anions of the formula

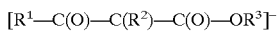

where $R^1$, $R^2$ and $R^3$ may be the same or different alkyl or aryl groups or halogenated all groups and in addition $R^2$ may be a hydrogen atom.

Of these, preferred metallocene catalysts which carry a methyl or a 1,3-dimethyl or a 1,2,4-trimethyl cyclopentadienyl ligands (ie when n is 1–3) give rise to (co)polymers in which the terminal unsaturation is predominantly a vinylidene group e.g. suitably >97%, preferably >99% vinylidene. However, where the value of each of m and n in these catalysts is 4 or 5, the product may comprise a significant proportion of vinyl terminated chains.

The cocatalyst comprises a Group III metal alkyl and a triarylboron compound.

Preferred Group III metal alkyl compounds are trialkylaluminium compounds in particular triisobutylalurninium. Other suitable Group III metal compounds include tri(sec-butyl)boron and triethyl boron.

A preferred triaryl boron compound is tris (pentatluorophenyl)boron.

In the catalyst system of the present invention the mole ratio of the triaryl boron to metallocene is suitably in the range 0.1 to 100, preferably in the range 0.5 to 50 and most preferably in the range 1 to 5.

The concentration of the Group III metal alkyl may be most beneficial between at a minimum that is required to neutralise any harmful impurities present in the feedstock and a maximum governed level by its potential to degrade the activating effect of the aryl boron compound.

Within the above range the mole ratio of the Group III metal alkyl to the aryl boron compound is in the range from 0.01 to 300, preferably in the range 0.5 to 100 and most preferably in the range 1 to 40.

The metallocene catalyst and the cocatalyst may suitably be supported on supports which include organic and inorganic materials such as polymers and inorganic metal and non-metal oxides, in particularly porous materials. While conventional support materials may be suitable, supports with particularly high porosity are preferred due to their ability to facilitate maximum contact between the reactants and catalyst while retaining the catalyst in supported form.

Examples of suitable support materials are macroporous or mesoporous silica or other non-metal or metal-oxides such as alumina, titania or mixtures of oxides. Alternatively the support may be a polymer. A preferred support is silica.

An important feature of the present invention is that these catalysts, when used to catalyse the (co)polymerisation of α-olefins, give a product which is substantially pure in the sense that they only contain terminal unsaturation and is substantially free of any product which carries internal unsaturation.

The α-olefins to be (co)polymerised suitably have 3 to 25 carbon atoms, preferably 3–12 carbon atoms which may be copolymerised with ethylene. Preferred α-olefins are propylene, 1-butene or 1-decene. The reactant α-olefin may be essentially pure α-olefins or mixtures of α-olefins with ethylene or dienes such as 1,7-octadiene, or, with inert diluents such as saturated hydrocarbons and halogenated solvents and/or minor amounts of other olefins. Preferred saturated hydrocarbon diluents are C4 hydrocarbons.

The catalysts of the present invention are particularly suitable for use in continuous liquid phase or in continuous fixed bed (co)polymerisation processes.

By using a fixed bed of the supported catalyst easy separation of catalyst and product may be achieved allowing isolation of a product containing very low catalyst residues beneficial for both the further functionalisation of the product as well as ensuring effective use of the catalyst system in a continuous process.

Catalyst separation may also be facilitated in a continuous liquid phase process by judicious selection of catalyst particle size which would allow easy physical separation of catalyst from product.

Operation of a continuous fixed bed process also allows control of residence time by controlling the feed rate. This may allow fine control of product molecular weight in addition to the usual method of temperature variation. For instance, for a given zirconocene catalyst according to the present invention, increasing the reaction temperature is likely to decrease the molecular weight of the (co)polymer product whereas increasing the monomer concentration is likely to increase the molecular weight of the polymer. Whichever technique is used, the polymers made using the catalysts of the present invention have a low molecular weight distribution, ie Mw/Mn=1.5 to 3, wherein Mw represent the weight average molecular weight and Mn represents the number average molecular weight of the (co) polymer.

Thus, according to a further embodiment, the present invention is a process for the preparation of substantially pure terminally-unsaturated polymers or copolymers of α-olefins, said process comprising polymerising or co-polymerising the α-olefin(s) in the presence of a catalyst system as hereinbefore described.

The (co)polymerisation reaction is suitably carried out in the liquid/vapour phase. Where it is carried out in the liquid phase, it is preferable that the reactants and catalysts are dissolved in a diluent which may be a saturated/unsaturated or aromatic hydrocarbon or a halogenated hydrocarbon which is/are normally inert under the reaction conditions and which do not interfere with the desired (co)polymerisation reaction. Examples of suitable solvents that may be used include inter alia toluene, xylene, isobutane, propane, hexane, etc. It is important that the reactants, catalysts and solvents, if any, used are pure and dry and contain no polar groups or contaminants.

The (co)polyrnerisation reaction is suitably carried out at a temperature in the range from 20 to 150° C., preferably in the range from 50 to 100° C. If it is desired to vary the molecular weight of a product (co)polymer for a given catalyst this variation—whilst difficult—is conventionally achieved by a significant change in the reaction conditions. For instance, more dilution may be needed or the reaction may have to be run at higher temperatures to achieve a product of relatively lower molecular weight. Raising the temperature within this range is not favoured since this may lead to α-olefin mis-insertion into the growing (co)polymer chain thereby leading to earlier termination and to the formation of less favoured internal olefin functionality in the (co)polymer. However, using the novel metallocene catalyst systems of the present invention, the molecular weight may be more easily controlled/varied by change of the nature of the leaving groups for a given catalyst system without sacrificing the benefit of high vinylidene content in the product (co)polymer.

The terminally unsaturated polymers of the present invention can be used either directly or be readily further derivatised using the high terminal unsaturation to make products suitable for use as fuel and lubricant additives such as dispersants, wax modifiers, flow improvers, dispersant-viscosity index improvers, viscosity modifiers and the like. The molecular weight of the polymers prepared according to the present invention are tailored according to the application required. For example Mn is maintained in the range from about 300 to about 10,000 for dispersant applications and from about 15,000 to about 500,000 for viscosity modifier applications. Where the polymer is required to have some dispersancy performance it is necessary to introduce polar functionality which enables the molecule to bind well to engine deposits and sludge forming materials.

Thus according to another aspect of the present invention there is provided a method of controlling the molecular weight of substantially terminally unsaturated atactic polymers or copolymers of α-olefins having a molecular weight in the range 300–500,000 by use of a catalyst system as hereinbefore described.

The reaction is suitably carried out in pressure range 10–40 bar but can be carried out at lower or higher pressures. The duration of the reaction is suitably in the range from 1 to 20 hours, preferably from 1 to 10 hours, and is usually from 1 to 3 hours.

The reaction when complete is terminated by venting the reactor and reducing the reaction temperature to about 20° C. A lower alcohol such as isopropanol can be added to the reactor after venting in order to quench the catalyst. The resulting (co)polymer which is in solution in the reaction solvent such as e.g. toluene is then drained from the base of the reactor and the reactor then washed with the reaction solvent. A solution of the reaction product in the reaction solvent is then washed with a small amount of dilute acid, e.g. hydrochloric acid, and then with distilled water, dried with magnesium sulphate, filtered and the reaction solvent removed by evaporation on a rotary evaporator. The evaporation is suitably carried out at 120 mbar pressure (although higher vacuums can be used) at 85° C. for about 3 hours and the oligomer/polymer is then recovered as residue.

A further feature of the present process is that the (co) polymers thus formed have a relatively low level of catalyst, cocatalyst or support residues when compared with (co) polymers obtained by (co)polymerisation using conventional catalyst/cocatalyst processes whether in slurry or dissolved form.

Furthermore the catalyst and reaction conditions are controlled such that the process produces essentially non crystalline (co) polymers. Absence of crystallinity is desirable to prevent the formation of cloudy and/or aggregated solutions. For polymers of α-olefins it is necessary to ensure that the polymers are atactic. When ethylene is used as a comonomer, it is important to control the ethylene concentration and distribution in the copolymer such that there are insufficient run lengths of ethylene segments present to give rise to crystallinity. For this reason it is necessary to limit the mole fraction of ethylene present in the (co) oligomer to less than 70 mole %, preferably less than 50 mole % and to ensure that the monomer feed ratio is well controlled throughout the reaction.

According to another aspect of the present invention there are provided substantially terminally unsaturated atatic polymers or copolymers of α-olefins having molecular weight in the range 300–500,000 prepared using a catalyst system as hereinbefore described.

The present invention will now be further illustrated with reference to the accompanying examples.

EXAMPLE 1

A 3 liter autoclave was thoroughly purged by heating under nitrogen. Tri-isobutylaluminium (1 ml of 1M solution in toluene) was introduced into the autoclave by syringe. The autoclave was then sealed and 2 liters of liquid propylene transferred into it. The contents of the autoclave were then stirred at 60° which was maintained by external circulation through the outer jacket of the vessel from a heater/cooler bath. The pressure and temperature of the autoclave were logged continuously. After two hours, a solution of 50 micromoles of tris(pentafluorophenyl)boron in 8 ml toluene was added. Bis(1,3-dimethylcyclopentadienyl)zirconium dimethyl (65 micromols dissolved in 15 ml toluene) was added in 5 micromol aliquots with fifteen minute spacings to maintain reactivity. At the end of reaction the products were drained from the reactor, and the catalysts neutralised with a little isopropanol. The resultant product was then washed with a little dilute hydrochloric acid followed by distilled water and then dried over magnesium sulphate. After filtering, the solvent was removed initially on a rotary evaporator and then on a rotary pump at 60C. The water white product isolated weighed 713 g.

The end groups on the material was analysed by nmr which showed that these consisted almost entirely of n-propyl (49.7%) and vinylidene (49.9%). This is as expected for termination by a β-hydrogen transfer mechanism and corresponds to 99.8% terminal vinylidene unsaturation. Molecular weight determined by same technique gave a value of 530 g/mol.

EXAMPLE 2

A 3 liter autoclave was thoroughly purged by heating under nitrogen. Triethylaluminium (3.5 ml of 0.1M solution in toluene) was introduced into the autoclave by syringe. The autoclave was sealed and 1 liter of liquid propylene transferred into it. The contents of the autoclave were then stirred at 60° C. for two hours which was maintained by external circulation through the outer jacket of the vessel from a heater/cooler bath. The pressure and temperature of the autoclave were logged continuously.

Into the attached injector assembly of the autoclave were added by syringe, tris(pentafluorophenyl)boron [as solution of 150 micromoles of in 15 ml toluene] and bis cyclopentadienyl zirconium dimethyl [150 micromols dissolved in 15 ml toluene]. These were allowed to react together for five minutes before being injected into the reactor under a positive pressure of nitrogen. After a further three hours, the products were drained from the reactor, and the catalysts neutralised with a little isopropanol. The resultant product was washed with a little dilute hydrochloric acid followed by distilled water and then dried over magnesium sulphate. After filtering, the solvent was removed initially on a rotary evaporator and then on a rotary pump at 0.1 torr. The water white product isolated weighed 62 g.

The end groups on the material were analysed by nmr which showed that these consisted of >97% terminal vinylidene unsaturation. Molecular weight determined by same technique gave a value of 800 g/mol.

EXAMPLE 3

Example 2 was repeated with the exception that 7.0 ml of 0.1M triethylaluminium were added to the propylene initially; and the reaction was run for 50 minutes. After a similar work up, 99 g of a water white viscous liquid was obtained. This material showed >97% terminal vinylidene unsaturation and had molecular weight 900 g/mol.

EXAMPLE 4

Example 3 was repeated with the exception that only 75 micromoles of the bis(cyclopentadienyl)zirconium dimethyl were added and the reaction was run for 100 minutes. 115 g of product was recovered which had similar properties to that obtained in example 3.

The following examples illustrate the use of other Group III alkyl metals in place of the triorganoaluminium compounds.

EXAMPLE 5

A 3 liter autoclave was thoroughly purged by heating under nitrogen. Tri(sec butyl)boron (10 ml of 0.1M solution in toluene) was introduced into the autoclave by syringe. The autoclave was then sealed and 1 liter of liquid propylene transferred into it. The contents of the autoclave were then stirred at 70° C. which was maintained by external circulation through the outer jacket of the vessel from a heater/cooler bath. The pressure and temperature of the autoclave were logged continuously. After two hours the reactor was cooled to 60° C. Into the injector assembly were placed tris(pentafluorophenyl)boron [as a solution of 150 micromoles in 15 ml toluene] and bis cyclopentadienyl zirconium dimethyl [75 micromols dissolved in 15 ml toluene]. These were allowed to react together for five minutes before being injected into the reactor under a positive pressure of nitrogen. After one hour, the products were drained from the reactor, and the catalysts neutralised with a little isopropanol. The resultant product was washed with a little dilute hydrochloric acid followed by distilled water and then dried over magnesium sulphate. After filtering, the solvent was removed initially on a rotary evaporator and then on a rotary pump at 0.1 torr. The water white product isolated weighed 71 g.

The end groups on the material were analysed by nmr and showed to contain >97% terminal vinylidene units. Molecular weight determined by the same technique gave a value of 800 g/mol.

EXAMPLE 6

This was carried out in the same manner as example 5 with the exception that triethyl boron (1 ml of 1M solution in toluene) was used. A similar product yield (75 g) was recorded with Mn 800; and >97% terminal vinylidene groups.

EXAMPLE 7

Example 5 was repeated with the exception that 1 liter (740 g) of 1-decene was employed rather than propylene and the reaction was run for two hours at 80° C. After neutralising the catalyst solution, the product was analysed by gas chromatography and found to consist of (by weight excluding tolmene) unreacted monomer 46%; decene dimer 31%; trimer 10%; tetramer 5%; pentamer 3.5%; hexamer 2.7%; heptamer and higher molecular weight olefins +1.8%.

What is claimed is:

1. A catalyst system suitable for use in the preparation of substantially terminally unsaturated atactic polymers or copolymers of α-olefins having a number average molecular weight in the range 300–500,000 said catalyst system comprising (A) a metallocene of formula:

$$[R_mCpH_{(5-m)}][R_nCpH_{(5-n)}]M(Z)Y$$

wherein
   CpH is a cyclopentadienyl ligand,
   each R represents an alkyl or an aryl substituent on the CpH ligand or two R's may be joined together to form a ring,
   M is a metal selected from hafnium, zirconium and titanium, each of m and n is the same or different and has a value of 0 to 5, and
   Z and Y are hydrocarbyl, and (B) a cocatalyst comprising (i) a trialkylaluminium compound or a trialkylboron compound and (ii) a triarylboron compound.

2. A catalyst system according to claim 1 wherein the metal is zirconium.

3. A catalyst system according to claim 1 wherein the Z and Y groups are methyl.

4. A catalyst system according to claim 1 wherein the metallocene is either bis(1,3-dimethylcyclopentadienyl) zirconium dimethyl or bis(cyclopentadienyl)zirconium dimethyl.

5. A catalyst system according to claim 1 wherein the mole ratio of the Group III metal alkyl compound to the triaryl boron compound is in the range 0.01 to 300.

6. A catalyst system according to claim 1 wherein the trialkylaluminium compound is triisobutylaluminium.

7. A catalyst system according to claim 1 wherein the triaryl boron compound is tris(pentafluorophenyl)boron.

8. A catalyst system according to claim 1 wherein the mole ratio of the triaryl boron compound to the metallocene is in the range 0.1 to 100.

9. A catalyst system according to claim 1 wherein the metallocene and/or the cocatalyst is supported.

10. A catalyst system according to claim 9 wherein the support is silica.

11. A process for the preparation of substantially pure terminally unsaturated polymers or copolymers of α-olefins or copolymers of α-olefins with ethylene said process comprising polymerising or co-polymerising the α-olefin in the presence of a catalyst system according to claim 1.

12. A process according to claim 11 wherein the α-olefin is 1-decene.

13. A process according to claim 11 wherein the α-olefin is propylene.

14. A process according to claim 11 wherein the α-olefin is 1-butene.

* * * * *